United States Patent [19]
Sneider

[11] 3,774,267
[45] Nov. 27, 1973

[54] STOCKING PAIR RETAINER

[76] Inventor: Vincent R. Sneider, 3422 Hallcrest Drive, Atlanta City, Ga. 30319

[22] Filed: Aug. 23, 1972

[21] Appl. No.: 283,103

[52] U.S. Cl............ 24/81 D, 24/129 B, 24/DIG. 29
[51] Int. Cl................................................. A44b 21/00
[58] Field of Search................ 24/30.5 L, 7, 73 GS, 24/DIG. 29, 81 R, 49 S, 49 KC, 81 D, 81 GS, 81 DM, 81 CH, 81 CC, 115 G, 264, 263 SB

[56] References Cited
UNITED STATES PATENTS

| | | | |
|---|---|---|---|
| 2,294,527 | 9/1942 | Weiss | 24/73 GS UX |
| 2,438,645 | 3/1948 | Palagonia | 24/81 D |
| 2,899,153 | 8/1959 | Parker | 24/85 B UX |
| 3,013,604 | 12/1961 | Roberts | 24/130 X |
| 3,279,479 | 10/1966 | Solomon | 24/137 A X |
| 3,414,944 | 12/1968 | Rabinowitz | 24/DIG. 29 |
| D165,621 | 1/1952 | West | 24/129 B X |
| 749,847 | 1/1904 | Curtis | 24/130 UX |
| 941,105 | 11/1909 | Seibel | 24/81 GS |
| 1,020,963 | 3/1912 | Cake | 24/130 X |
| 1,373,619 | 4/1921 | Kohn | 24/81 D |
| 1,622,324 | 3/1927 | Lettre | 24/129 B |
| 1,660,778 | 2/1928 | Andrew | 24/DIG. 29 |
| 1,806,162 | 5/1931 | Hahn | 24/129 B UX |
| 1,859,817 | 5/1932 | Dodd | 24/73 GS |
| 1,909,561 | 5/1933 | Abraham | 24/73 GS |
| 2,134,350 | 10/1938 | Wooley | 24/115 G UX |

FOREIGN PATENTS OR APPLICATIONS 924,762   3/1947   France ............................ 24/136 R

*Primary Examiner*—Donald A. Griffin
*Attorney*—Ralph R. Roberts

[57] ABSTRACT

This invention pertains to a low cost retaining member disposed to receive and retain a pair of socks during the time that they are washed in a washing machine and without removing this pair from said retaining member the pair of socks are dried as by an automatic dryer and the like. After drying, the socks, still retained by this member, may be hung on a nail or on a small pin until ready for removal from the retaining clip and used by the wearer of the socks. This retaining member is depicted in several modifications all utilizing a plastic molded member of low cost, the plastic having deterioration resistance to washing soaps and the like and also drying temperatures.

4 Claims, 11 Drawing Figures

Patented Nov. 27, 1973 3,774,267

3,774,267

STOCKING PAIR RETAINER

BACKGROUND OF THE INVENTION

1. Field of the Invention

With respect to the classification of art as established in the United States Patent Office the present invention pertains to the general class of "Textiles Fluid Treating Apparatus" and to the subclass therein "Accessories-clamps." This patent also pertains to the general class of "Buckles, Buttons, Clasps, etc." and to the subclass therein of "clothespins" and the further subclass of "Kerf-type clothespins" and also to the further subclass of "plural clasp." Pertinent art may also be found in this class and the subclass of "article holders."

2. Description of the Prior Art

The classification of socks or stockings by color, texture, size and weaving pattern is a problem when a large group of washed and dried stockings must be matched. Some attempts have been made to provide a simple clip which will retain the socks in a matched condition for the washing and drying of these retained stockings after which they are accumulated in pairs. Most of this apparatus is in the form of clothespins or the housewife may simply knot the socks together and wash and dry them in the customary manner. Tying together in pairs causes stretching, undue wear in localized areas and often prevents the stockings from drying in a more or less flat pattern and the tied stockings may become unknotted. Clothespins may be accidently opened defeating the original intent. Stocking holders are represented in the following Patents: in U.S. Pat. No. 3,346,927 to TOMPKINS as issued on Oct. 17th, 1967 a button and a tapered retaining aperture are employed. In U.S. Pat. No. 3,357,070 to SLOAN of Dec. 12th, 1967 a disc having a plurality of radially disposed slits is disclosed. In U.S. Pat. No. 3,170,213 to THOMAS of Feb. 23rd, 1965 and U.S. Pat. No. 1,806,162 to HAHN holder apparatus similar to SLOAN are disclosed. A spring clip is shown in U.S. Pat. No. 3,414,944 to RABINOWITZ of Dec. 10th, 1968.

In the present invention there are shown six embodiments whereby matched pairs of stockings may be mounted and secured prior to their washing. In this member the socks are retained as they are washed without tangling and then after washing they may be placed in a dryer for the drying thereof. Without removing the pair of socks from the retaining member the socks may be hung by this member for storage on pins or headless nails until time for use. In the several embodiments shown the stockings are lightly retained but positively gripped so that they may not be accidentally dislodged from the retaining means during the washing and drying. After drying they may be mounted upon a storage retaining pin after which they may be easily slid from the pin and the wearer may easily disengage each of the stockings from the retaining clip.

SUMMARY OF THE INVENTION

This invention may be summarized at least in part with reference to its objects.

It is an object of this invention to provide, and it does provide, a retaining clip whereby each of the socks of a pair of socks or stockings may be inserted and retained in an inexpensive member during the washing, drying and storage of the stockings.

It is a further object of this invention to provide, and it does provide apparatus wherein each of a pair of stockings may be stored for the washing, drying and storage thereof in which the retaining member is formed of an inexpensive molded plastic which may be readily molded, said plastic being relatively stable and immune to the environment found in the drying and washing of the stockings.

In a preferred embodiment of this apparatus there is shown a one-piece molded member in which a pair of keyhole-type openings are formed for the insertion therein and by which is separately retained one of each of the pair of stockings. In an alternate embodiment a single sheet of molded plastic has four elliptical apertures formed therein and through adjacent pairs of apertures a long stocking is inserted and pulled substantially tight to retain the stockings during the washing and drying thereof.

In two other shown embodiments a single member of molded plastic is formed with a pair of slot-type gripping means which slots, when the adjacent wing-like member portions are dislodged sidewards, permit the insertion of the stocking therein after which the clip portion is moved back into its molded plane to grip and retain the stockings.

In another embodiment a retaining frame having a pair of circular apertures formed therein retains a sliding member having like pair of apertures. A spring means is disposed to urge the sliding member to a stocking retaining position. When the sliding member is moved to a position whereat the apertures are aligned a stocking may be readily inserted into an aligned aperture after which the slide member is released so that the spring will urge the sliding member into a gripping condition to retain the stocking.

In a final embodiment a single molded member has a pair of jaw-like members each of which are simultaneously or singly opened by squeezing an integral handle means. In the open condition a stocking is inserted into each of the jaws and with the release of the handle members the jaws engage and retain each of the stockings.

Each embodiment is preferably a molded member and upon these members may be formed raised letters or numbers by which the members may be distinguished from one another. These numbers will enable blind or color blind users to distinguish one pair of stockings from another.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or addition of further improvements. For this reason there has been chosen a specific embodiment of a stocking pair retainer as adopted for use with the washing, drying and showing a means for storage of the now cleaned and dried pair of socks. This specific embodiment and alternate embodiments thereof have been chosen for the purposes of illustration and description as shown in the accompanying drawing wherein:

BRIEF DESCRIPTION OF THE DRAWING

In the following description and in the claims various details will be identified by specific means for convenience. These names, however, are intended to be generic in their application. Corresponding reference characters refer to like members throughout the several figures of the drawing.

This drawing accompanying, and forming part of, this specification discloses certain details of construction for the purpose of explanation of the invention, but it should be understood that structural details may be modified in various respects and that the invention may be incorporated in other structural forms than shown.

DESCRIPTION OF THE EMBODIMENT OF FIGS. 1, 2, AND 3

Figure 1:
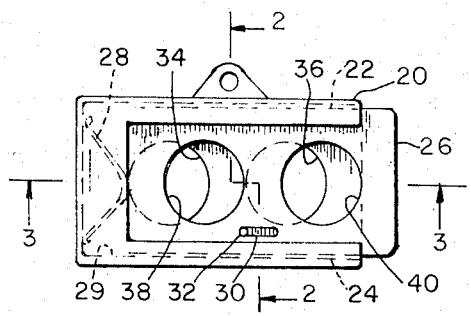
FIG. 1 represents a plan view of a sock retaining clip which has a sliding sandwich construction in which one of the members is a sliding member which is spring biased to a determined clamping position to retain the inserted pair of socks.
Figure 2:
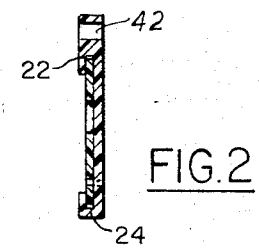
FIG. 2 represents a side sectional view taken on the line 2—2 of the clip of FIG. 1.
Figure 3:
FIG. 3 represents a sectional view taken on the longitudinal line 3—3 of the clip of FIG. 1.

Referring now in particular to the drawing and to FIGS. 1 through 3 there is shown in these views and substantially in full size a stocking retaining clip in which a frame member 20 is formed with parallel facing guideways 22 and 24. Slidably retained in these guideways is a tongue member 26. This slidable tongue member is urged rightwardly by means of a retained leaf-type spring 28 which spring is trapped in a recess 29 formed at the left end of member 20. A slot 30 formed in member 26 acts as a limiting slide stop for defining the travel of tongue 26 in both its right and left directions. A pin 32 retained in member 20 is the stop pin means which extends into slot 30 to limit movement of the member 26. In member 20 there are formed a pair of circular apertures 34 and 36 of a determined size and spacing. Like-sized and spaced apertures 38 and 40 are formed in tongue member 26 so that when this tongue member 26 is slid to the left as determined by the limit of the pin 32 in slot 30, aperture 34 is aligned with aperture 38 and aperture 36 is aligned with aperture 40.

USE AND OPERATION OF THE RETAINING MEMBER OF FIGS. 1 - 3

In operation the person accumulating the stockings for washing will compare and match the stockings as to color, size and composition and will then grasp the retainer above described. The ends are gripped and the sliding member 26 is pushed leftwardly to align the apertures 34 and 38 and apertures 36 and 40. Through one of the aligned apertures one end of a stocking is inserted and pulled about half way. Through the other aligned aperture the other stocking is inserted and drawn into half way condition. After the stockings have been inserted the member 26 is released and by means of spring 28 is urged substantially to the position shown in FIG. 1. In this position each sock is trapped and retained. One retaining member is used for each pair of stockings. This retaining member and inserted stockings are placed in the washing machine and washed in the usual manner after which they are removed and placed into a drier for drying or hung to dry on a line or the like. After drying, the retained stocking and holder unit are removed and by means of a suspending aperture 42 may be hung on a pin or nail (not shown) until the stockings are to be used. It is to be noted that the materials used in this retaining member are plastic materials which have characteristics which are unaffected by the water and soap used in washing and also by the heat normally used in drying clothes, such heat of course being substantially less than three hundred and fifty degrees Fahrenheit. Many plastics have these capabilities among them Lexan, a polycarbonate resin TM of General Electric.

EMBODIMENT OF FIGS. 4 AND 5

Figure 4:
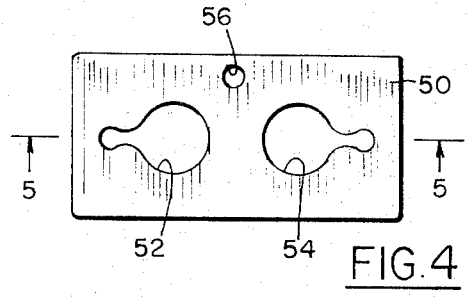
FIG. 4 represents a plan view of a simple one-piece clip member in which each of the pair of retaining apertures are a key-hole-type configuration.
Figure 5:
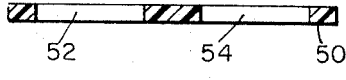
FIG. 5 represents a longitudinal sectional view taken on the line 5—5 of the clip of FIG. 4.
Figure 9:
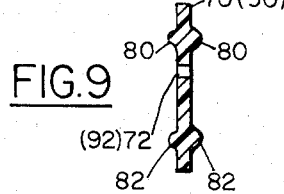
FIG. 9 represents a sectional view taken on the line 9—9 of either FIG. 7 or of FIG. 8.

Referring next to FIGS. 4 and 5 there is depicted a simple one-piece retaining member for engaging and retaining a pair of socks. This member is shown substantially full size and is a plate member whose body 50 is preferably a molded or die-cut piece of plastic. In this plate body 50 there are formed two keyhole shaped apertures 52 and 54 with the smaller portion of the keyhole preferably extending towards the ends of the body. An aperture 56 is formed centrally and near the upper edge of this plate member. Like the aperture 42 in member 20 of FIG. 1 this supporting aperture 56 is used with a pin to store a pair of socks. This member may be about one-sixteenth of an inch or more thick as seen in FIG. 5. Preferably the edges of the apertures 52 and 54 are slightly beveled to provide smooth surfaces through which the socks are passed for retaining of the stockings therein.

USE AND OPERATION OF THE RETAINER OF FIGS. 4 AND 5

To use the sock retainer of FIGS. 4 and 5 it is only necessary that the one preparing the socks for washing accumulate the socks as pairs as in FIG. 1. A stocking is threaded through the larger portion of an aperture 52 or 54 and after being more or less adjusted as to its midlength is drawn outwardly into the reduced keyhole portion to pinch the sock in a retained condition. The other stocking is now inserted into the other aperture and at its mid-length is likewise drawn outwardly into the reduced keyhole portion for pinching of the stocking and providing a retaining condition. After accumulation of the desired pairs of stockings to be laundered, each pair being mounted in a member 50, the stockings are placed into a washing machine and washed. After washing the member and socks are placed in a drier for drying or hung to dry after which they may be stored by suspending on a pin entered through aperture 56 until time for use of the stockings and reuse of the sock retainer.

RETAINER OF FIG. 6

Figure 6:
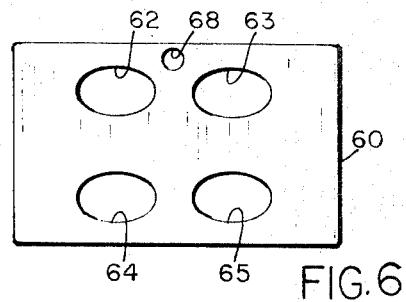
FIG. 6 represents a plan view of a retaining clip in which two pairs of elliptical holes are provided, each pair disposed in an aligned relationship so that a stocking may be inserted through one of the pairs of holes and drawn into retaining condition.

Referring next to the retainer depicted in FIG. 6 there is shown an alternate arrangement to the retainer as shown in FIG. 5. This retainer, as shown, consists of a flat plate 60 having four elliptically shaped apertures 62, 63, 64, and 65 formed therein and spaced in a rectangular pattern. The thickness of this plate 60 is about one-sixteenth to one-eighth inches. A small aperture 68 provides suspending means for the plate with or without a pair of stockings mounted therein.

USE AND OPERATION OF RETAINER OF FIG. 6

The plate 60 of FIG. 6 is grasped by the user who threads or guides a stocking through one of the apertures 62, 63, 64 and 65. This same stocking is then threaded through one of the other apertures and drawn tightly in and between these apertures. Still grasping the plate the user or operator inserts the other stocking into one of the unused apertures and then through the remaining aperture and the stocking is drawn tightly. Washing, drying and the support aperture is used with this member like the member seen in FIGS. 1 and 4.

It is of course realized that the stockings may be arranged through apertures 62 and 64, through 62 and 63 or through 62 and 65. The other stocking is then fed through the remaining apertures.

RETAINING CLIP OF FIG. 7

Figure 7:
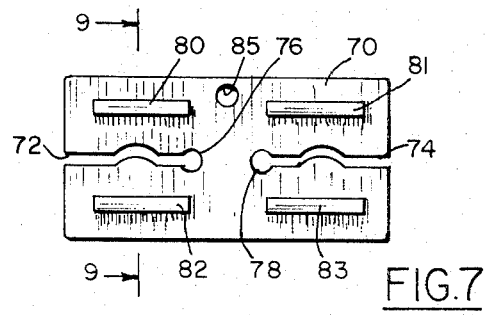
FIG. 7 represents a plan view of a one-piece molded retaining clip in which each of the sock retaining means includes a slot having an inner arcuate configuration formed intermediate thereof, the gripping action on a stocking being provided by displacing the slot-retaining leaf portions adjacent the slot sidewards for the insertion of the stocking thereinto and then moving the leaf members into an aligned condition.

Referring next to FIG. 7 there is shown a retaining member 70 similar in size and composition to the member 50 shown in FIG. 4. Instead of the keyhole aperture of FIG. 4 there is formed in this plate member 70 a pair of open ended slots 72 and 74. These slots, as depicted, instead of being straight have their midportions formed with an arcuate offset with the inner end of the slot terminating at small circular apertures 76 and 78. Adjacent to these slots on each side are raised portions 80, 81, 82 and 83 for a purpose to be here and after described. Like raised and identified portions are provided on the far side of the plate member 70.

USE AND OPERATION OF THE RETAINER OF FIG. 7

The retaining member 70 is shown substantially and preferably about full size and to mount a pair of stockings in this retaining member it is contemplated that one of the pairs of stockings will be arranged in a more or less flattened condition and edgewise aligned with a slot such as slot 72. The user grasps and pushes the raised portions 80 and 82 in such a manner as to displace these wing-like side portions of the slot into a determined misalignment so that the stockings may be easily slid into the now widely opened slot 72. After this stocking has been largely moved into this slot to the extent that the inner edge is retained in the aperture 76 these extending wing-like members are pushed back into their normal plane. Moving into this plane, of course, the member portions adjacent the slot lightly pinch and retain the stocking in the slot.

In a like manner the other stocking is inserted into slot 74. The wing-like portions on either side are grasped by the user and are moved or pushed so as to displace the wing portions out of plane to cause the slot 74 to open up after which the stocking is slid into this slot until the entering end engages and is retained in the inner end by aperture 78 after which the wing portions are urged back into a common plane. This slot retains the stocking after which the retained pair of stockings and member 70 is placed in a washing machine for washing as above described and after later drying operations may be hung upon a pin by means of aperture 85 in a manner of the other embodiments above described.

DESCRIPTION OF THE EMBODIMENT OF FIG. 8

Figure 8:
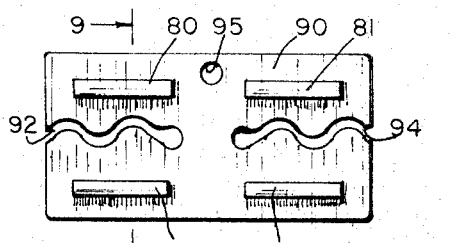
FIG. 8 represents a plan view of a one-piece molded retaining clip similar to that of FIG. 7 but with the retaining slot being contoured in a serpentine or a thread like configuration.

Referring now to FIG. 8 there is depicted a planar member 90 similar to the member 70 in FIG. 7 however in this embodiment the slots are made serpentine or thread-like. These slots are depicted and identified as 92 and 94. During their length they have several convolutions. On each side of each of the slots 92 and 94 are formed bead or rib portions 80, 81, 82 and 83 which are like those provided in FIG. 7. Aperture 95 is provided for suspending the member 80 upon a nail or pin.

USE AND OPERATION OF THE APPARATUS OF FIG. 8

In the manner of member 70 described in FIG. 7 this member 90 is grasped by the operator and with the fingers causes the wing members adjacent the slots 92 or 94 to be displaced sideways to open up the slot whereupon a stocking is slid into the slot to its more or less full extent. After the sock is inserted, the wing members on each side of a slot are pushed back into their formed plane. This will, of course, cause the slot to grip the stocking and retain the stocking therein. As in FIG. 7 the rib portions 80, 81, 82 and 83 are grasped and manipulated to cause the tongue portions on either side of the slot to be displaced from their plane to cause the slot to be opened up. After both stockings are inserted and gripped and with the wing portions pushed into their common plane to each grip a stocking, the retained pair of stockings are laundered as above after which the paired stockings may be hung upon a pin by means of aperture 95.

STOCKING RETAINER OF FIGS. 10 AND 11

Figures 10, 11:
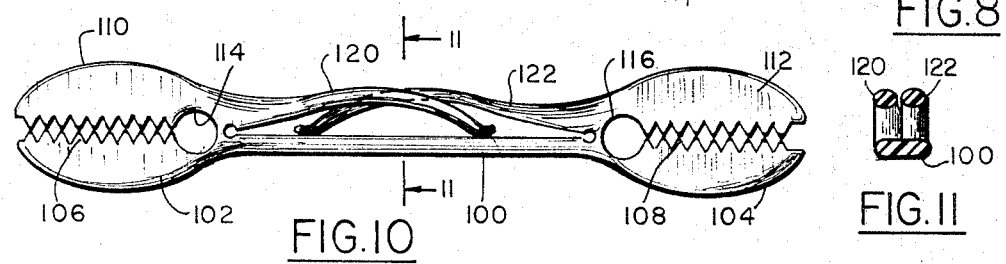
FIG. 10 represents a plan view of a one-piece molded clip member having jaw members formed on each end thereof, the jaws being closed by means of spring handles which jaws are opened when the handles are gripped and squeezed to cause the jaw members to open.
FIG. 11 represents a somewhat diagrammatic sectional view taken on the line 11—11 of FIG. 10 and looking in the direction of the arrows and showing the relationship of the various spring handles components of this clip member.

Referring finally to a sock retaining member as depicted in FIGS. 10 and 11 there is shown a molded clip member which includes a bar portion 100 and integrally attached to each end of this bar portion 100 is an end clip. The left end has a lower jaw 102 and the right end a jaw member 104. These jaws are made as a portion of a single molded unit with more or less smooth teeth identified as portions 106 and 108. Upper jaws 110 and 112 are attached by a small bridge portion 114 and 116 to the bar member 100 and also to extending bridge members 120 and 122. The upper jaws are structurally connected to and actuated by bent beam members 120 and 122. These bent beams are handle units whose ends rest upon an upper extent of beam 100 and act as and provide a spring to urge the opposed facing teeth carried by jaws 102 and 110 into engagement. In a like manner the bent beam 122 urges the jaw 112 into an engaging condition with jaw 104. In its molded condition the central portions of the bent members 120 and 122 in their horizontal attitude are displaced from each other then are curved back to rest upon the beam portion 100. This is particularly depicted in FIG. 11.

USE AND OPERATION OF THE EMBODIMENT OF FIGS. 10 AND 11

In essence this embodiment is a pair of joined clips which are made as a unitary molded plastic member. The characteristics of the plastic are of being able to withstand the washing solvents as well as the drying temperatures. Although made as a unitary member this retainer may have one or both jaws opened by simultaneously or individually gripping the arcuate beams 120 and 122 substantially where they cross. These raised portions are pressed toward the beam 100 which causes the flex portions 114 and 116 to bend to open up the jaws 110 and 112. When these jaws are opened the stockings are inserted after which the members 120 and 122 are released to allow the attached jaw portion of these beams 120 and 122 to be moved back to the condition seen in FIG. 10. The ends of the teeth of jaws 106 and 108 although shown as being rather sharp are rounded sufficiently to prevent tearing of the fragile fabric used in stockings.

In the embodiments shown and above described it is contemplated that they will be made and sold in groups such as by the dozen. Depending on the size of the wash load the one preparing for this chore may have a dozen or so pairs of socks. Whether done as a separate load or with other clothes it is necessary that the stocking pairs be maintained in their grouped condition hence it is contemplated that the size and contour of apertures will be made of varying sizes to accomodate the many thicknesses, materials and lengths of stockings. The material for these units are preferably of molded plastic which is selected for its ability to withstand washing solvents, soaps and the like and also drying temperatures found in automatic driers.

It is contemplated that in grouping these paired sock retainers in multiples for sale that in addition to making the retainers in various colors that other identification may be provided. This identification may be in the form of numbers, dots and the like. By these or like means as many as two dozen or more holders of one size may be individually identifiable to those who may be color blind or actually blind. This identification is also useful to the laundry attendant who may have two or more families or persons using his services.

Terms such as "left," "right," "up," "down," "bottom," "top," "front," "back," "in," "out," and the like are applicable to the embodiments shown and described in conjunction with the drawing. These terms are merely for the purposes of description and do not necessarily apply to the position in which the paired stocking retainer may be constructed or used.

While particular embodiments of the stocking retainer have been shown and described it is to be understood that modifications may be made within the scope of the accompanying claims and protection is sought to the broadest extent the prior art allows.

What is claimed is:

1. A paired stocking retainer of plastic which is characterized in that said plastic, as a material, is resistant to repeated exposure to laundry soaps, powders, detergents and the like and at the same time is stable and unaffected with like repeated exposures to temperatures usually found in the drying chamber of an automatic clothes drier, said stocking retainer including: a unitary planar retaining member having a pair of keyhole-shaped sock retaining openings therein, each keyhole having a larger opening of about one-half inch in diameter and extending outwardly and away from each larger opening is a connecting passageway which is about one-sixteenth to three thirty-seconds of an inch in width which joins a small circular opening of about one-eighth inch in diameter, each larger opening formed so as to receive one of a pair of socks and in said connecting passageway and smaller opening to retain the sock during at least the washing of the pair of socks in a washing machine and without removal of the socks from their retaining opening to further maintain the socks in their secured condition during a drying period in an automatic clothes drier, said planar member includes an additional aperture midway of the two larger sock openings providing means for removably suspending said retainer and retained socks on a fixed pin and the like.

2. A paired stocking retainer of plastic which is characterized in that said plastic, as a material, is resistant to repeated exposure to laundry soaps, powders, detergents and the like and at the same time is stable and unaffected with like repeated exposures to temperatures usually found in the drying chamber of an automatic clothes drier, said stocking retainer including: a planar member having opposed guideways in which a tongue member is slidably retained, said planar member having a pair of like-sized substantially circular apertures on a determined spacing, said tongue member also having apertures which are sized and spaced to correspond to the apertures in the planar member; means for determinedly limiting the travel of the tongue member in the guideways so that at a first extent of travel the apertures in the planar member and the tongue member are substantially in coincidence and at the second limit of travel of apertures in the tongue are displaced more than 50 percent of their diameter from the apertures in the planar member to provide a pair of releasable sock-retaining openings, and there is provided a spring means disposed to engage the planar member and tongue member to urge the tongue member to the second limit of travel.

3. A paired stocking retainer of plastic which is characterized in that said plastic, as a material, is resistant to repeated exposure to laundry soaps, powders, detergents and the like and at the same time is stable and unaffected with like repeated exposures to temperatures usually found in the drying chamber of an automatic clothes drier, said stocking retainer including: a unitary planar member having opposed sock-retaining openings which are open ended slots extending from opposite edges of the member inwardly toward each other, the slots having a substantially constant width and a somewhat serpentine configuration and with the inner end of each of the slots terminating at a larger circular aperture and with the planar member portions on each side of the slot providing wing-like side portions, each wing-like portion having raised portions formed on each planar face and adjacent each side of the slot to provide a finger engaging and manipulating assist by which to move said wing-like portions to and from their originally formed planes and when said portions are laterally displaced to provide a misalignment of the portions and an enlarged open end into which the sock is slid thereinto after which the wing-like portions are moved to their original planar condition to grip and retain a stocking in the slot.

4. A paired stocking retainer of plastic which is characterized in that said plastic, as a material, is resistant to repeated exposure to laundry soaps, powders, detergents and the like and at the same time is stable and unaffected with like repeated exposures to temperatures usually found in the drying chamber of an automatic clothes drier, said stocking retainer including: a retainer which is a unitary molded device which includes a bar portion having a lower jaw attached to each end thereof, each jaw having smooth teeth molded thereon; an upper molded jaw adjacent each lower jar, each attached by a small bridge portion to the bar so that the jaws mate and form a toothed clamp each of which is retained and urged into a gripping condition with the mating jaw by an integrally attached bent beam member forming a handle whose unattached end rests upon an upper extent of said bar portion, said beam portions passing by each other substantially at their curved apex and providing means for singularly and simultaneously opening said jaw pairs for the insertion and removal of a sock.

* * * * *